United States Patent
Black (10) Patent No.: US 7,093,366 B2
(45) Date of Patent: Aug. 22, 2006

(54) GROUND SUPPORTED PORTABLE TOOL GUIDE

(76) Inventor: William Edward Black, 2509 Manor Oak Dr., Modesto, CA (US) 95355

( * ) Notice: Subject to any disclaimer, the term of this patent is extended or adjusted under 35 U.S.C. 154(b) by 0 days.

(21) Appl. No.: 10/846,090

(22) Filed: May 14, 2004

(65) Prior Publication Data

US 2004/0255471 A1    Dec. 23, 2004

Related U.S. Application Data (60) Provisional application No. 60/482,080, filed on Jun. 23, 2003.

(51) Int. Cl.
*B26B 27/00* (2006.01)
(52) U.S. Cl. ............. 30/296.1; 16/427; 30/275.4; 30/340
(58) Field of Classification Search ......... 30/296.1, 30/340, 275.4, 228, 245; 248/287.1; 16/427; 56/16.7

See application file for complete search history.

(56) References Cited

U.S. PATENT DOCUMENTS

| | | | |
|---|---|---|---|
| 2,762,186 A | 9/1956 | Janata | |
| 4,044,979 A * | 8/1977 | Lemmo | ............. 248/647 |
| 4,197,764 A | 4/1980 | Auernhammer | |
| 4,207,675 A | 6/1980 | Causey et al. | |
| 4,515,423 A | 5/1985 | Moore et al. | |
| 4,638,562 A | 1/1987 | Drake | |
| 4,733,470 A | 3/1988 | Firman | |
| 4,760,646 A | 8/1988 | Siegler | |
| 4,976,031 A | 12/1990 | Miller | |
| 5,095,687 A * | 3/1992 | Andrew et al. | ............. 56/12.7 |
| 5,295,620 A | 3/1994 | Cousineau et al. | |
| 5,411,238 A * | 5/1995 | Caron | ............. 248/664 |
| 5,477,665 A * | 12/1995 | Stout | ............. 56/16.7 |
| 6,488,511 B1 | 12/2002 | Stewart | |
| 6,715,272 B1 | 4/2004 | Stahl | |

FOREIGN PATENT DOCUMENTS

| | | |
|---|---|---|
| CA | 2190037 | 11/1996 |
| FR | 2492047 | 10/1980 |
| FR | 2812068 | 1/2002 |
| GB | 2266682 | 10/1993 |

* cited by examiner

*Primary Examiner*—Timothy V. Eley
*Assistant Examiner*—Isaac Hamilton (57) ABSTRACT

A tool guide enables the earth or other surfaces to support the weight of a portable tool without using wheels or casters while providing a unique combination of adjustments positioning portable tools such as hedge trimmers to trim hedges or shrubs accurately. A first set of telescoping tubes is hinge coupled to one end of a second set of telescoping tubes. The other end of the second set of telescoping tubes rests and pivots upon the earth providing weight support and unique arc and rotational adjustment for the portable tool. The portable tool is mounted onto one end of a first set of telescoping tubes with a tool to handle adapter. An electrical cord is inserted through a portable tool handle extension and connects to the portable tool. A locking adjustment on the second set of telescoping tubes controls height adjustment.

7 Claims, 11 Drawing Sheets

GROUND SUPPORTED PORTABLE TOOL GUIDE

CROSS-REFERENCE TO RELATED APPLICATION

This application claims the benefit of Provisional Patent Application Ser. No. 60/482,080 filed 2003 Jun. 23.

FEDERALLY SPONSORED RESEARCH

Not Applicable

SEQUENCE LISTING OR PRINCIPLE

Not Applicable

BACKGROUND-FIELD OF INVENTION

This invention relates to adapters used to extend the useful position of portable tools, specifically to allow maximum maneuverability of a common portable hedge trimming device at an extended position with minimum effort while using a surface rather than the operator to support the weight of the portable tool.

BACKGROUND DESCRIPTION OF PRIOR ART

Hedges can reach heights of 3 feet to 8 feet high and from 1½ feet to 6 feet wide. Hedges are also found positioned in close proximity to and parallel with walls, buildings or fences. The hedge's close proximity to walls, buildings or fences renders their top sections inaccessible unless workers use ladders or other elevating means to reach the inaccessible sections of the hedge or shrub. There are expensive hedge trimmers on the market designed for professional landscapers but these trimmers are to expensive for the individual. Thereafter inventors have invented adapters and other devices to trim the tops of high hedges. U.S. Pat. No. 4,515,423 to Moore (1985) discloses an extension device for electrically powered tools such as hedge trimmers. While the adapter does extend the position of the hedge trimmer it also requires the operator to bear the full weight of the tool assembly over his head to reach the tops of hedges higher than shoulder level. It also does not accommodate the proper angle to reach the further most back edge of the tops of hedges higher than the height of the operator unless the operator uses a ladder or other means to elevate himself. Devices such as ladders or other elevating means prove to be dangerous and unstable on the uneven ground in landscaping environments. U.S. Pat. No. 6,488,511 B1 to Stewart (2002) reaches the furthermost back edge of the hedge mentioned in the comments about Moore's patent but the operator must still bear the full weight of the tool assembly. Stewart's device has an adjustment shown as FIG. 2 in the patent. The angle adjustment shown must be locked into position prior to the start of work and can not be changed while cutting the hedge. In order to change the angle the operator must stop work and adjust the blade angle to a new position and then lock the new position before the work can continue. The operator can not change the angle of the cutting head while simultaneously cutting the hedge. On higher and wider hedges the hedge trimmer portion of the assembly is extended far out in front of the operator. Because hedge trimmers can weigh more than 10 pounds and the weight is extended far out in front of the operator to reach areas of the hedge as much as 6 feet wide the operator must exert considerable energy and strength before the hedge is completely trimmed. These extreme positions are awkward and can cause personal injury such as muscle strain if the operator is not careful. U.S. Pat. No. 4,207,675 to Causey and Yeager (1980) illustrates an adjustable utility extension handle for electrically powered hand tools. The operator must bear the full weight of the tool assembly in order to operate the hedge trimmer or other portable tools. This device has an adjustment shown as FIG. 2 in the patent. This position must be fixed prior to operation and can not be changed while simultaneously cutting the hedge

OBJECTS AND ADVANTAGES

Accordingly, several objects and advantages of the present invention are:

(a) To provide a Ground Supported Portable Tool Guide with a weight support means to allow most of the weight of the tool assembly to be supported by the ground instead of the operator.

(b) To provide a Ground Supported Portable Tool Guide easily adaptable to the majority of common hedge trimmers and other portable tools using a tool to handle adapter attachment means (c) To provide a Ground Supported Portable Tool Guide with the ability to infinitely adjust the angle of the cutting tool in relation to the surface of the hedge while the hedge is being trimmed.

(d) To provide a Ground Supported Portable Tool Guide with an adjustment means to control the distance the blade of the tool extends into the hedge while the operator is simultaneously cutting the hedge.

(e) To provide a Ground Supported Portable Tool Guide promoting safety by eliminating the need for ladders or other elevating means to access high hard to reach areas of shrubs and hedges.

(f) To provide a Ground Supported Portable Tool Guide promoting safety by allowing the operator to trim the top of high hard to reach areas of shrubs and hedges without having to bear the full weight of the tool while trimming is in progress.

Further objects and advantages are to provide a Ground Supported Portable Tool Guide allowing complete maneuverability to do work while promoting safety and ease of use. Still further objects and advantages will become apparent from a consideration of the ensuing description and drawings.

SUMMARY

In accordance with the present invention a Ground Supported Portable Tool Guide comprises a portable tool accessory which allows a portable tool to be extended to access high hard to reach areas of hedges or shrubs. The majority of the Ground Supported Portable Tool Guide and portable tool's weight is supported by a surface other than the operator promoting safety and a minimum risk of operator injury. The Ground Supported Portable Tool Guide allows an operator to maneuver the tool blade of a portable tool to a plurality of positions necessary to properly shape the hedge's or shrub's top surface while simultaneously doing work.

DRAWINGS

Drawing Figures

In the drawings, closely related figures have the same number but different alphabetic suffixes.

DETAILED DESCRIPTION

Figure 1:
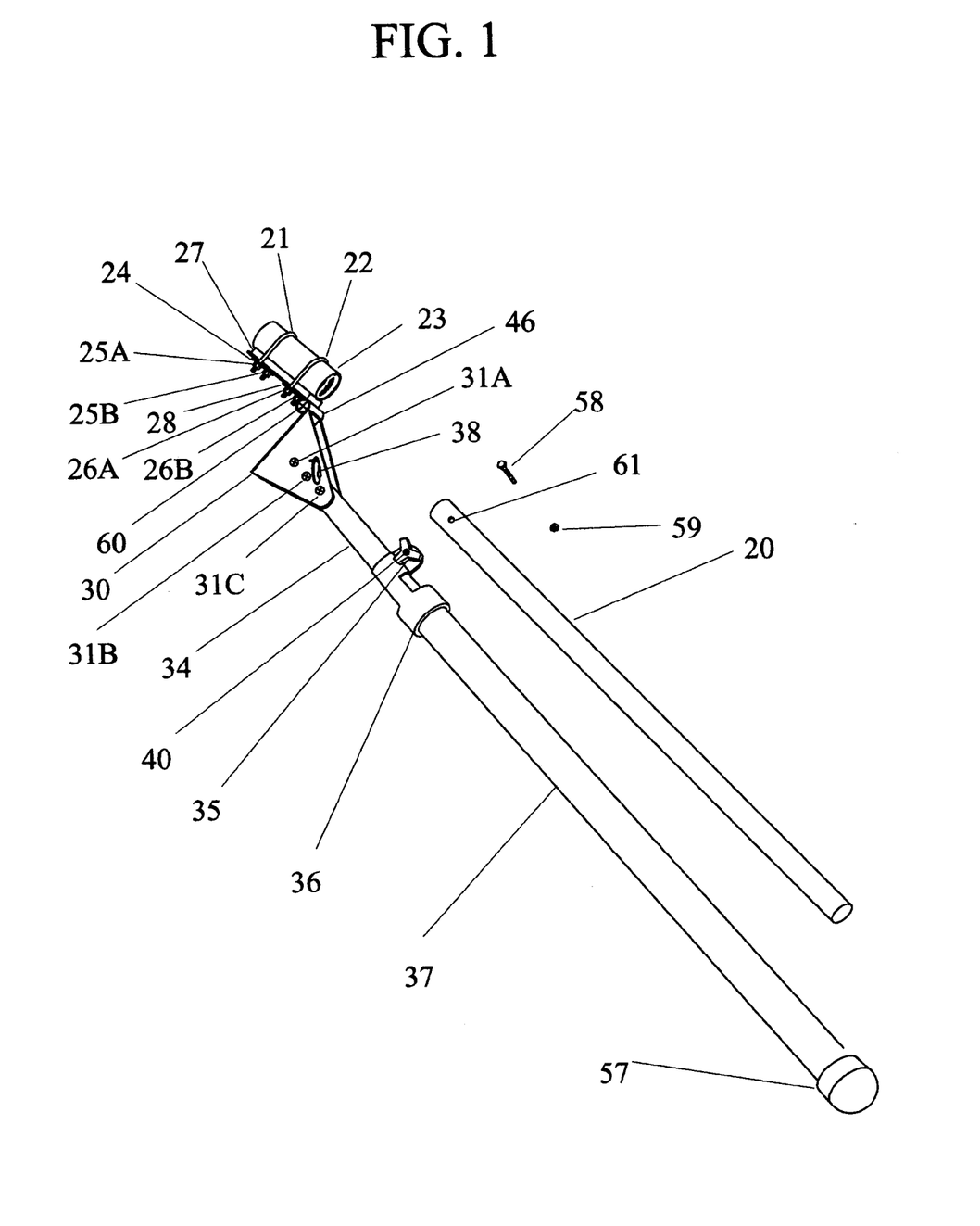
FIG. 1 is a perspective view of the Ground Supported Portable Tool Guide assembly and portable tool handle extension.
Figure 11:
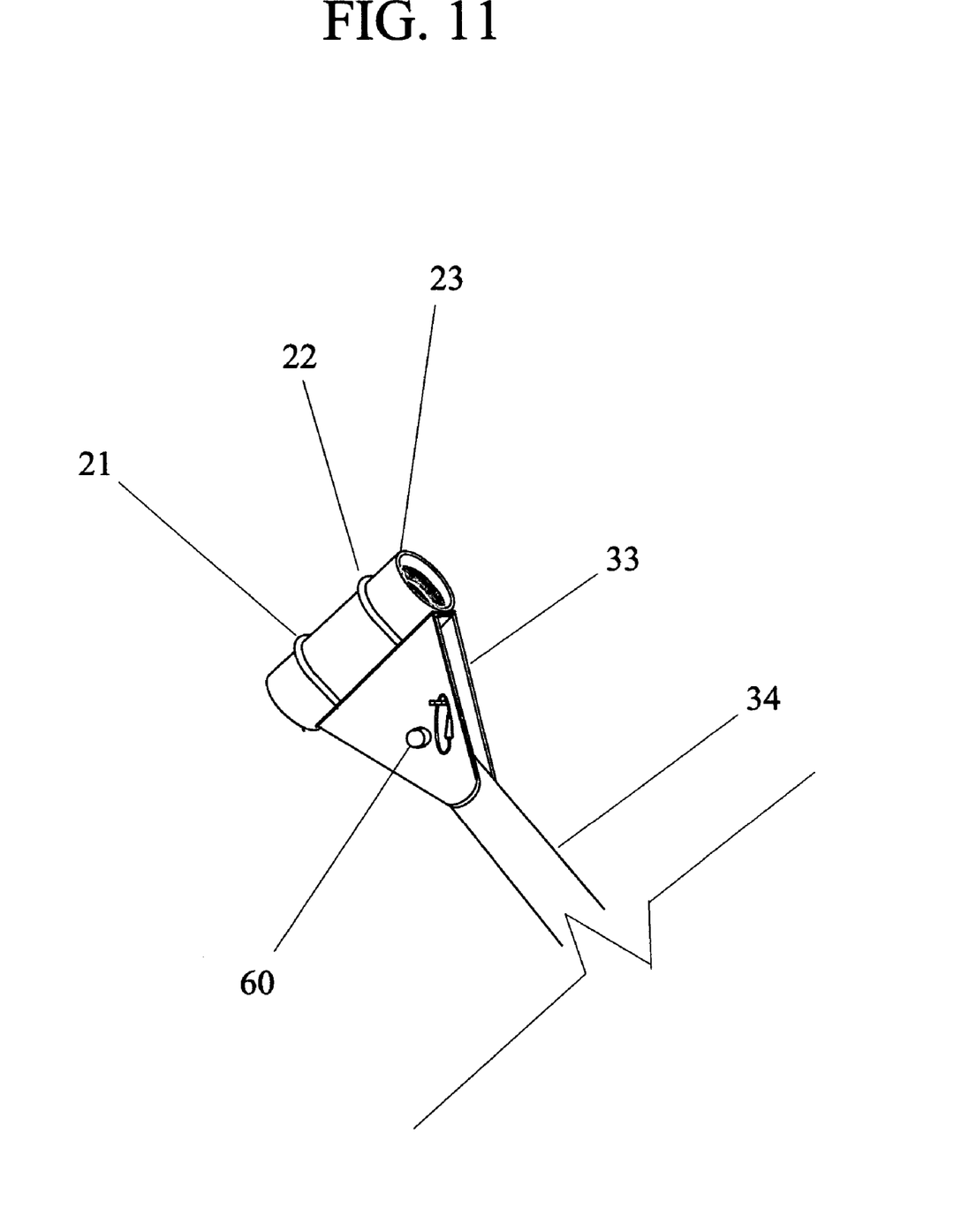
FIG. 11 is a perspective showing an alternate embodiment combination hinge bracket.

A Ground Supported Portable Tool Guide of the present invention is illustrated in FIG. 1. The Ground Supported Portable Tool Guide has a ground support pivoting foot 57. The ground support pivoting foot 57 is permanently attached to the height adjustment sleeve 37 with a compatible permanent adhesive. In the preferred embodiment the ground support pivoting foot 57 is a cup shaped cylindrical cap made of rubber or plastic and the height adjustment sleeve 37 is a tube made from light weight strong tubing such as fiberglass plastic or metal. FIG. 1 illustrates a height adjustment locking bracket 36 having one inside radius slightly larger than the outside radius of the height adjustment sleeve 37 and is fitted over and is permanently attached to the height adjustment sleeve 37 with a compatible permanent adhesive. The height adjustment locking bracket 36 has a second inside radius that is adjustable from slightly larger than to slightly smaller than the outside radius of a height adjustment tube 34 said adjustable second inside radius is made smaller or larger turning the height adjustment locking handle 35. The second inside radius of the height adjustment locking bracket 36 is centered in relation to the inside radius of the height adjustment sleeve 37 to allow the height adjustment tube 34 to be inserted into the height adjustment sleeve 37. The preferred embodiment of the height adjustment locking bracket 36 is formed metal. In FIG. 1 the height adjustment locking handle 35 is attached to the height adjustment locking bracket 36 with a locking handle retaining fastener 40. The locking handle retaining fastener 40 is a threaded fastener. A clockwise turning of the height adjustment locking handle 35 causes the second inside radius of the height adjustment locking bracket 36 to reduce in radius while a counter clockwise turning causes the second inside radius of the height adjustment locking bracket 36 to increase in radius. Said height adjustment locking handle 35 is constructed with a durable plastic or metal material. The preferred embodiment of the height adjustment tube 34 is a tubing made of fiberglass, plastic or metal. The embodiment of 35, 36 and 40 described herein is only one of the many types of locking devices commonly available to be used as a height adjustment and locking means. Other embodiments will be considered and applied to suit pricing or application criteria. One alternate height adjustment and locking means consists of a ¼ turn cam locking device. The height adjustment sleeve 37 and height adjustment tube 34 are rotated in opposite directions in relation to each other and 2 rubber pads are pushed against the inside diameter of the height adjustment sleeve 37 locking the height adjustment sleeve 37 and height adjustment tube 34 in position together.

FIG. 1 illustrates a height adjustment tube 34 inserted into the height adjustment locking bracket 36 on one end and attached to a bottom hinge transition bracket 30 on the other end. The bottom hinge transition bracket 30 is connected to the height adjustment tube 34 using transition bracket mounting screws 31A, 31B and 31C. The preferred embodiment of the bottom hinge transition bracket 30 is made of metal. A electrical cord retainer ring 38 is mounted onto the bottom hinge transition bracket 30. The electrical cord retainer ring 38 has a spring loaded clip to allow a common electric extension cord 65 to be inserted into and removed from the retainer ring easily without any special tools. A top hinge plate 46 is permanently attached to the bottom hinge transition bracket 30 using a hinge pin 60 allowing free rotation of the bottom hinge transition bracket 30 to any angle in one plane up to 80 degrees in relationship to the top hinge plate 46. The preferred embodiment of the hinge pin 60 is a metal rod material. The top hinge plate 46 is made of metal. Many other embodiments of the hinge assembly consisting of 30, 31A, 31B, 31C, 46 and 60 can be designed and applied. FIG. 11 illustrates one such alternate embodiment of said hinge assembly using the end of the height adjustment tube 34 to replace the bottom hinge transition bracket 30. A combination hinge bracket 33 replaces the top hinge plate 46 and bottom hinge transition bracket 30. A hole is drilled in the end of the height adjustment tube 34 and the hinge pin 60 is inserted through creating a hinged coupling between the combination hinge bracket 33 and height adjustment tube 34 without sacrificing function. FIG. 1 illustrates A tool handle sleeve 23 held in position over the top hinge plate 46 using a sleeve mounting pad 27, front pipe clamp 21 and a rear pipe clamp 22. The front pipe clamp 21 holds the front portion of the tool handle sleeve 23 in position over the sleeve mounting pad 27 and top hinge plate 46 by inserting a front pipe clamp retainer 24 onto the front pipe clamp 21 and threading two front pipe clamp nuts 25A and 25B on to the ends of the front pipe clamp 21. The rear pipe clamp 22 holds the rear portion of the tool handle sleeve 23 in position over the sleeve mounting pad 27 and top hinge plate 46 by inserting a rear pipe clamp retainer 28 onto the rear pipe clamp 22 and threading two rear pipe clamp nuts 26A and 26B on to the ends of the rear pipe clamp 22. The preferred embodiment of the tool handle sleeve 23 is a plastic, PVC or fiberglass tube. The front and rear pipe clamps 21 and 22 are made of metal with male machine threads on each of their two ends. The sleeve mounting pad 27 is made of plastic, wood or rubber. The front and rear pipe clamp retainers 24 and 28 are made of metal. The front and rear pipe clamp nuts 25A, 25B, 26A and 26B are made of metal and have female threads to match the male threads on the front and rear pipe clamps 21 and 22. A second embodiment of the tool handle sleeve 23, sleeve mounting pad 27 and mounting brackets 21, 22, 23, 24, 25A, 25B, 26A, 26B, 27 and 28 can be injection molded to reduce the number of components needed to provide fit form and function while reducing cost. A third embodiment can use metal electrical tubing clamps in place of the sleeve mounting pad 27 and mounting brackets 21, 22, 24, 25A, 25B, 26A, 26B and 28. FIG. 1 also illustrates a portable tool handle extension 20. The portable tool handle extension 20 has a extension position hole 61 drilled at one end. A handle extension retainer bolt 58 is made to insert into the extension position hole 61. The preferred embodiment of the portable tool handle extension 20 is an elongated tube made of plastic, fiberglass or PVC with an outside diameter slightly smaller than the inside diameter of the tool handle sleeve 23. The preferred embodiment of the handle extension retainer bolt 58 is a fastener with male threads made of metal or plastic long enough to extend through the extension position hole 61. The preferred embodiment of the handle extension retaining nut 59 is a fastener made of metal or plastic with matching female threads made to attach to the handle extension retainer bolt 58.

Figure 2A:
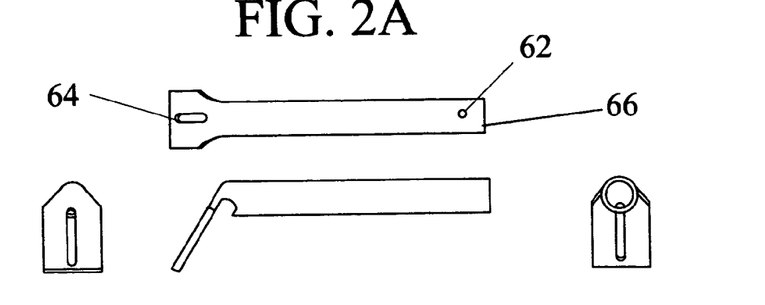
FIG. 2A is a front, top, left and right side view of the tool to handle adapter.
Figures 2B, 2C:
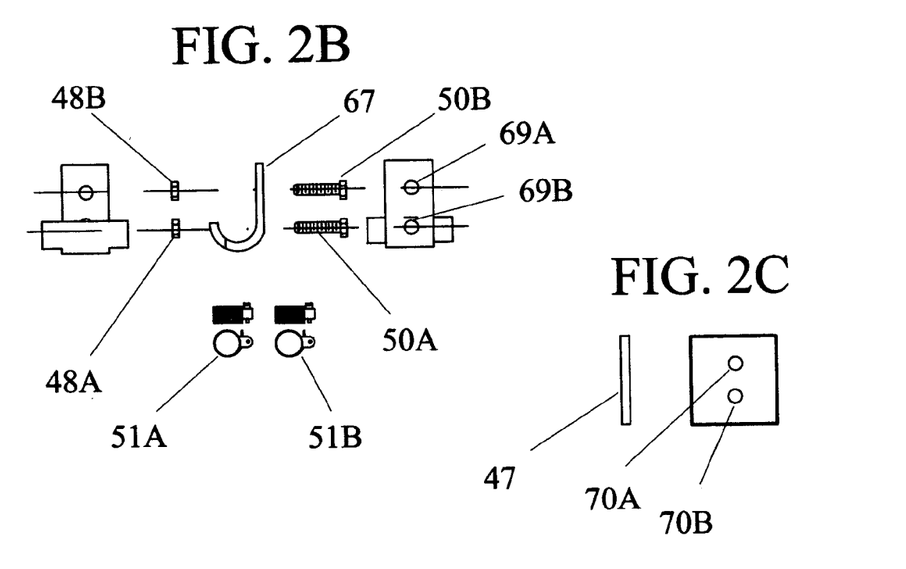
FIG. 2B front, left and right side view of tool handle bracket with associated hardware.
FIG. 2C is a front and left side view of the tool bracket back plate.
Figure 2D:
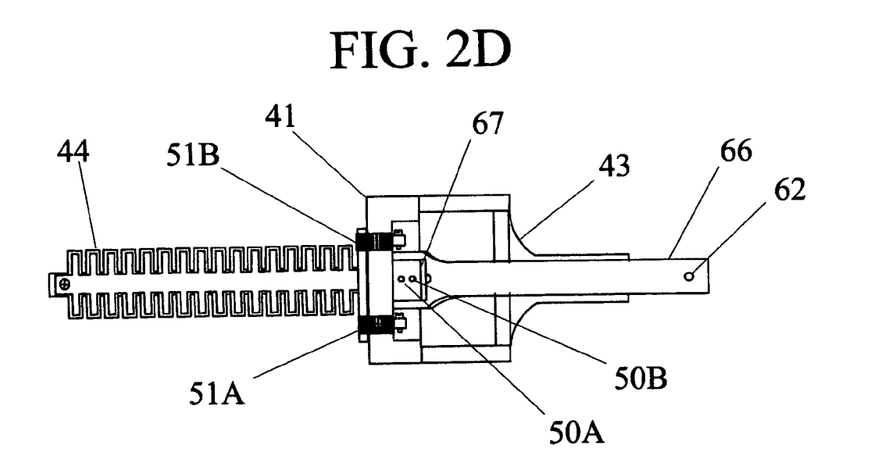
FIG. 2D is a top view of the portable tool with FIG. 2A, FIG. 2B and FIG. 2C assembled.
Figure 3:
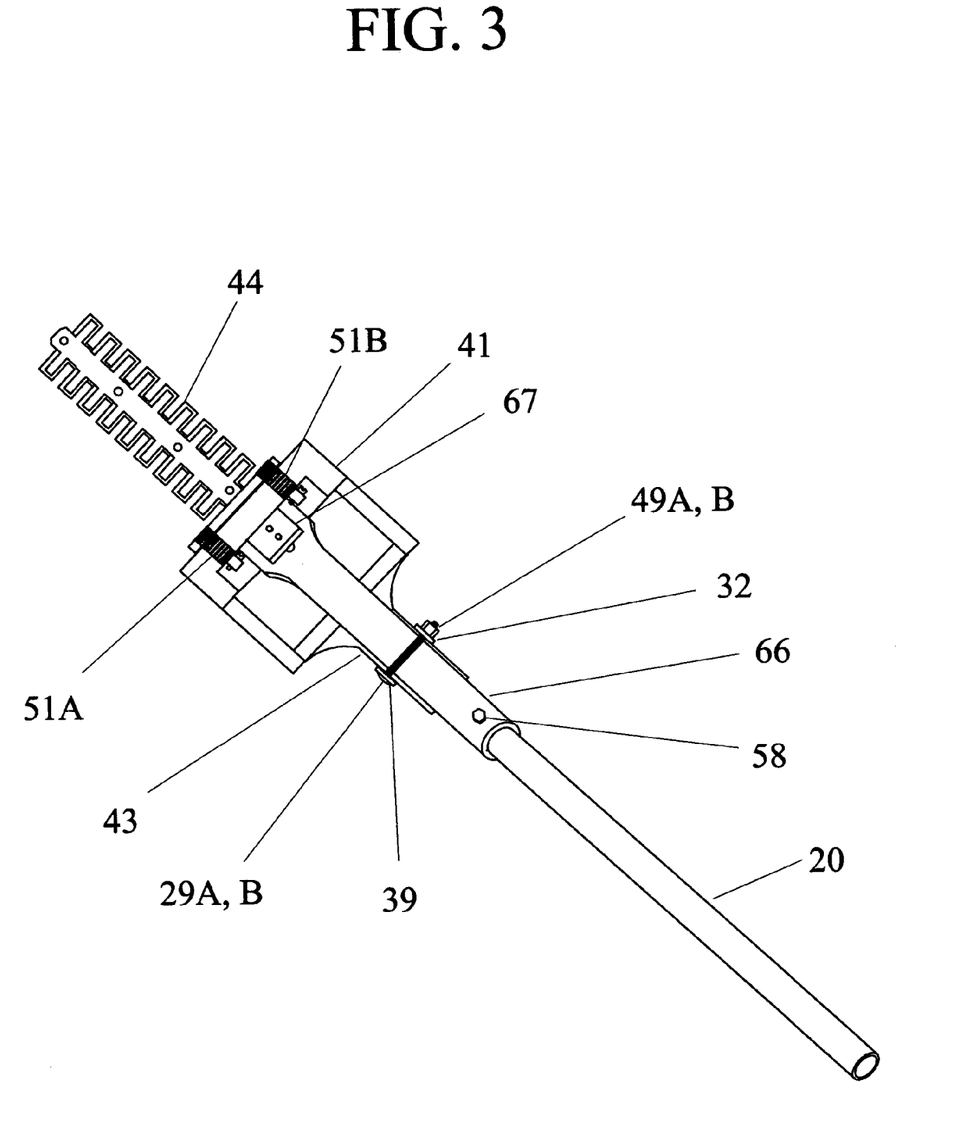
FIG. 3 is a top perspective view of a common hedge trimmer coupled to a portable tool handle extension using the tool to handle adapter assembly.
Figure 4:
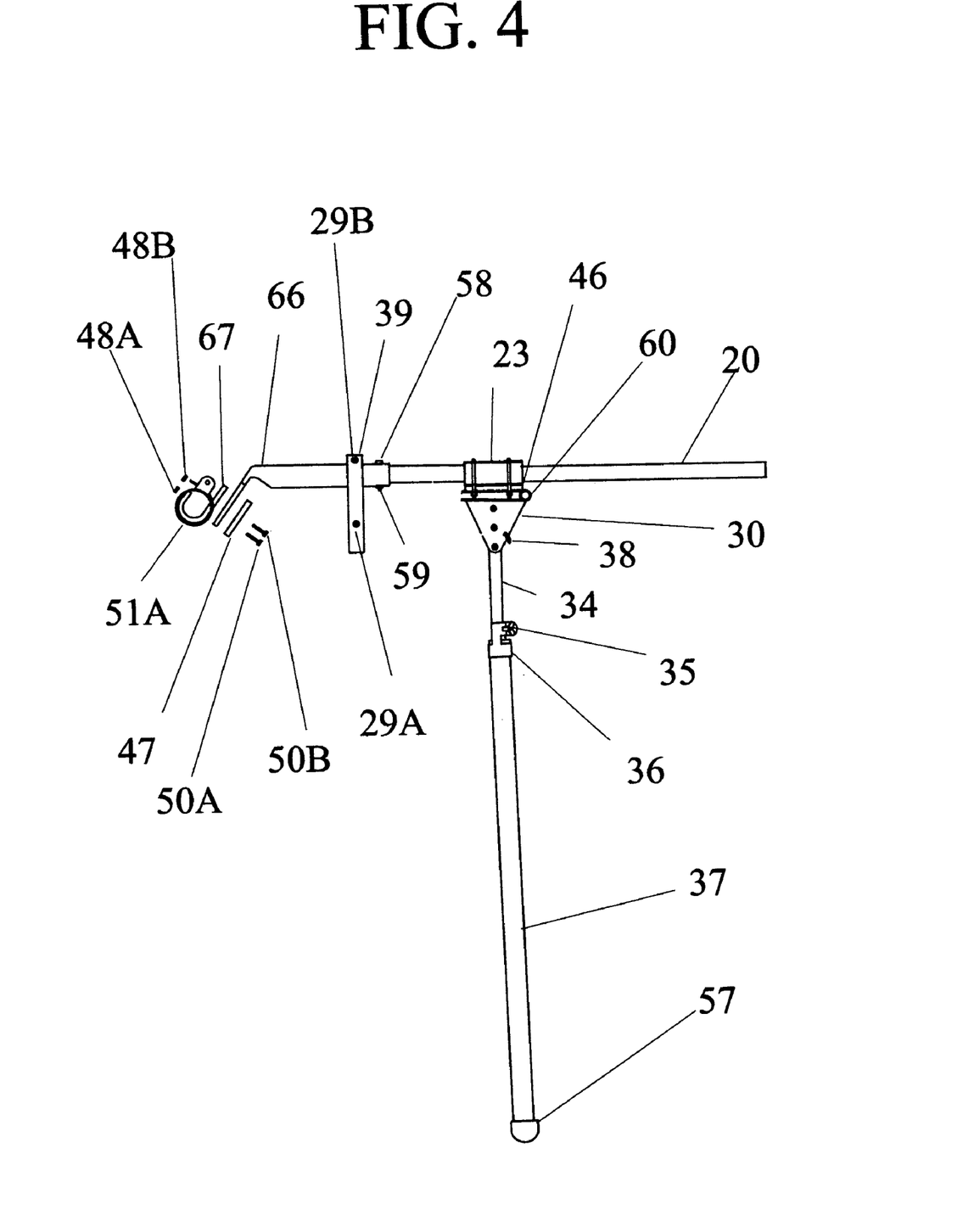
FIG. 4 is a side view of the preferred embodiment of the Ground Supported Portable Tool Guide without the portable tool attached.
Figure 5A:
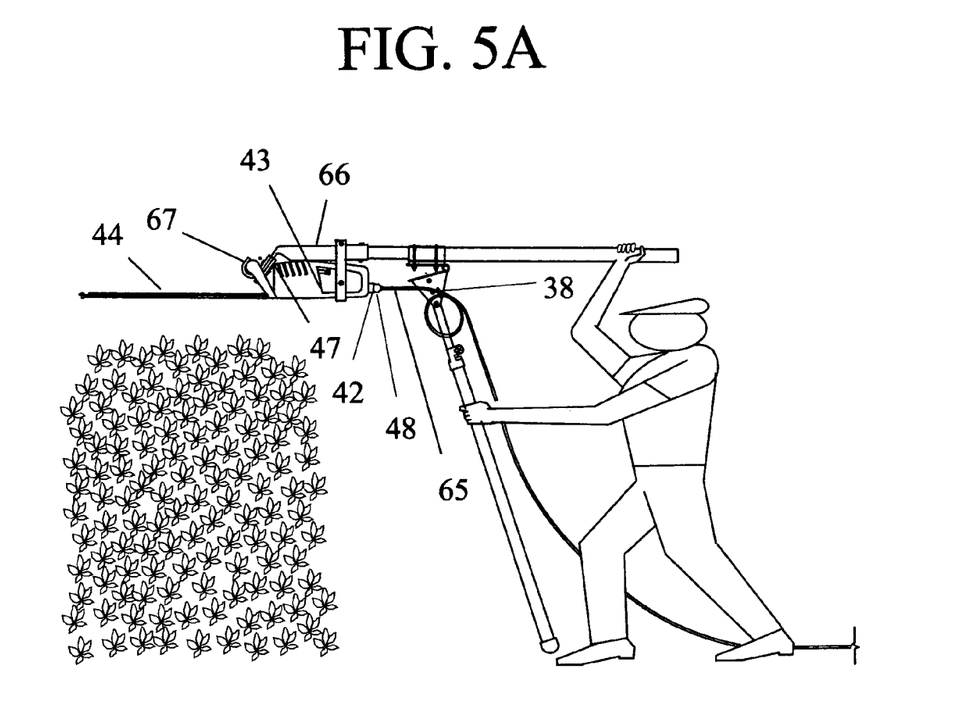
FIG. 5A and FIG. 5B is a side view of the Ground Supported Portable Tool Guide positioned to do work.
Figure 5B:
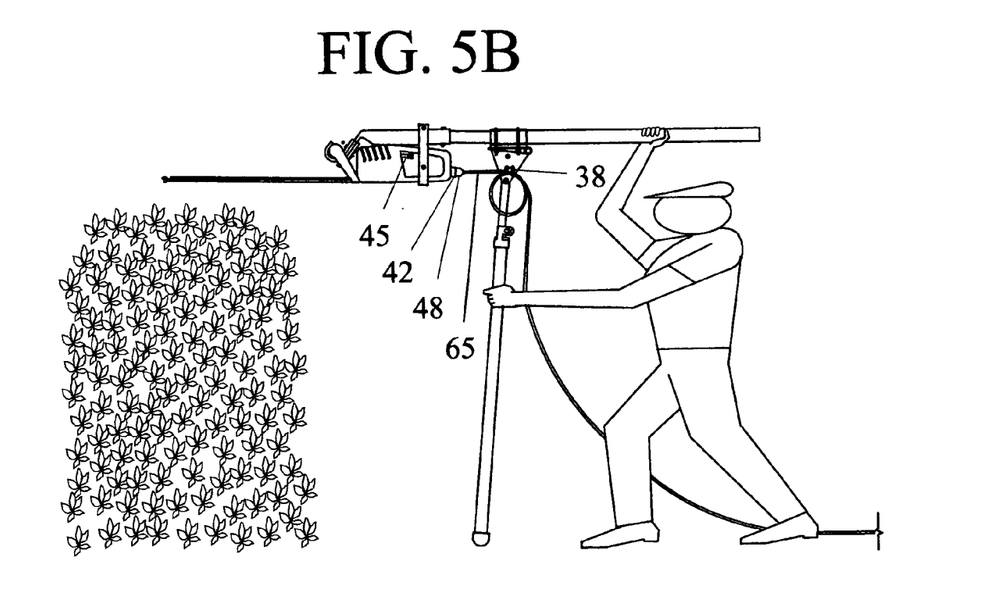

FIGS. 2 A, B, C and D show a tool to handle adapter 66 attached to the portable tool 43 using the tool bracket back plate 47 and tool handle bracket 67. The tool to handle adapter 66 has a handle adapter position hole 62 drilled through one end and a position adjustment slot 64 in the opposite end. The tool handle bracket 67 is attached to the portable tool handle 41 using the tool handle bracket clamps 51A and 51B. The tool to handle adapter 66 is then sandwiched between the tool handle bracket 67 and the tool bracket back plate 47. The tool bracket back plate 47 and tool handle bracket 67 each have two retainer holes 69A, 69B 70A and 70B drilled into them slightly larger than the tool handle bracket bolts 50A and 50B. The assembly is fastened together using the tool handle bracket bolts and nuts 50A, 50B, 48A and 48B respectively. The position adjustment slot 64 in the tool to handle adapter 66 is aligned with the 2 holes drilled into tool bracket back plate 47 and tool handle bracket 67 and is used to adjust the tool to handle adapter up and down once it is sandwiched between the tool handle bracket 67 and the tool bracket back plate 47. The up and down adjustment facilitates attachment of the tool to handle adapter 66 to most of the portable hedge trimmers commonly found for sale at hardware stores. The preferred embodiment of the tool to handle adapter 66, tool handle bracket 67 and tool bracket back plate 47 is plastic. The preferred embodiment of the tool handle bracket clamps 51A and 51B is a metal hose clamp with screw adjustment commonly found in hardware stores. The preferred embodiment of the tool handle bracket bolts 50A and 50B is a metal male threaded fastener. The preferred embodiment of the tool handle bracket nuts 48A and 48B is a metal female threaded fastener. Referring to FIG. 2, FIG. 3 and FIG. 5 the end of the portable tool 43 opposite the portable tool blade 44 is attached to the tool to handle adapter 66 using the rear portable tool left bracket 39, rear portable tool right bracket 32, rear portable tool bracket screws and nuts 29A, 29B, 49A and 49B. FIG. 3 illustrates the portable tool handle extension 20 attached to a portable tool 43. The preferred embodiment for the rear portable tool left bracket 39, rear portable tool right bracket 32, rear portable tool bracket screws and nuts 29A, 29B, 49A and 49B are made of metal. An alternate embodiment using a strap and cinching buckle or Velcro Hooks and Loops is also possible. Referring to FIG. 1, FIG. 2 and FIG. 3 mounting of the portable tool handle extension 20 to the portable tool 43 is accomplished by inserting the portable tool handle extension 20 into the end of the tool to handle adapter 66 until the extension position hole 61 is aligned with the handle adapter position hole 62 and then inserting the handle extension retainer bolt 58. The portable tool handle extension 20 and the tool to handle adapter 66 are held securely in place by threading the handle extension retainer nut 59 on to the handle extension retainer bolt 58. The handle extension retainer bolt 58 and handle extension retainer nut 59 are made of metal. The outside diameter of the portable tool handle extension 20 has a diameter slightly smaller than the tool handle sleeve 23 inside diameter.

Operation FIG. 1, FIG. 2, FIG. 3, FIG. 4, FIG. 4B

In order to use the Ground Supported Portable Tool Guide the operator begins by inserting the portable tool handle extension 20 into the tool to handle adapter 66 and aligning extension position hole 61 with handle adapter position hole 62. Handle extension retainer bolt 58 is inserted through said aligned position holes and the handle extension retainer nut 59 is threaded on to the handle extension retainer bolt 58. The tool handle bracket 67 is positioned on to the portable tool handle 41 and clamped tightly using tool handle bracket clamps 51A and 51B. The tool to handle adapter 66 is then sandwiched between the tool handle bracket 67 and tool bracket back plate 47 and aligned so that the position adjustment slot 64 is in alignment with the retainer holes 69A, 69B, 70A and 70B. The tool handle bracket bolts 50A and 50B are then inserted and the tool handle bracket nuts 48A and 48B are threaded on loosely. The tool to handle adapter 66 is then moved up or down using the position adjustment slot 64 to achieve the best position dependent on the brand of portable tool 43 being used. Once the preferred position of the portable tool 43 is found the tool handle bracket nuts 48A and 48B are tightened to hold the portable tool 43 firmly in position. The rear portable tool right bracket 32 and rear portable tool left bracket 39 are then mounted onto the rear portion of portable tool 43 using the rear portable tool bracket screws and nuts 29A, 29B, 49A and 49B respectively. The portable tool handle extension 20 is inserted through the tool handle sleeve 23. Extension cord 65 is plugged into an electrical outlet on one end and the portable tool male receptacle 42 on the other end. The extension cord 65 is then inserted into the electrical cord retainer ring 38. At this point the Ground Supported Portable Tool Guide looks as shown in FIG. 5A and FIG. 5B.

FIG. 5A, FIG. 5B, FIG. 7A, FIG. 7B, FIG. 8, FIG. 9 and FIG. 10

Figure 7A:
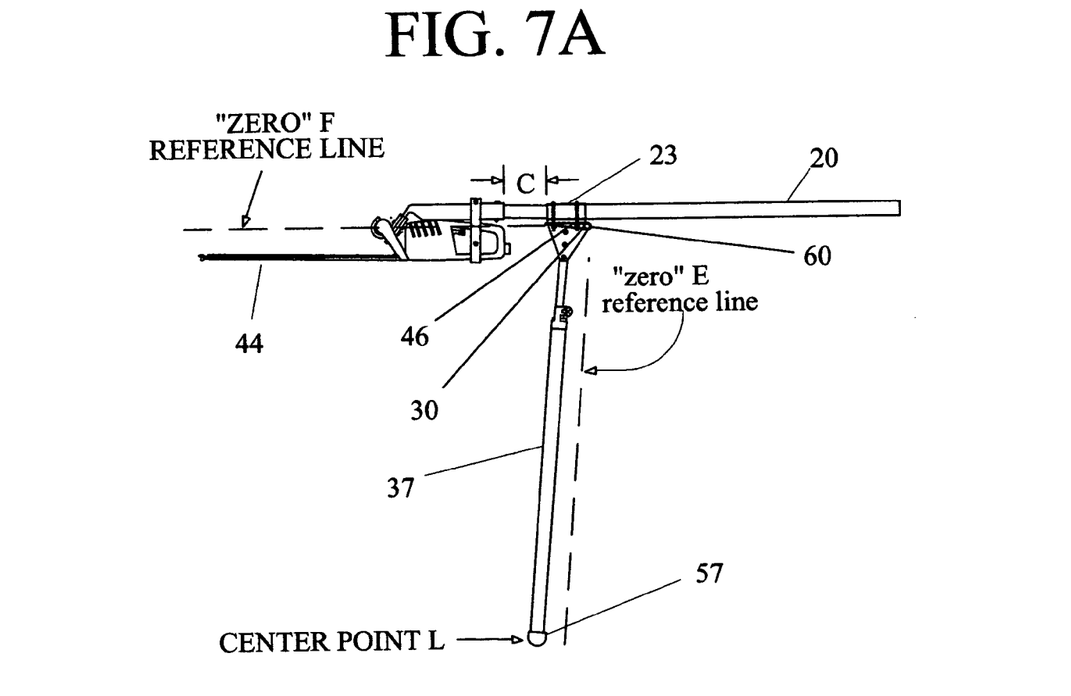
FIG. 7A and FIG. 7B are side views of the Ground Supported Portable Tool Guide illustrating the ranges of motion A, B, C, D, zero reference lines E, F and center point L.
Figure 7B:
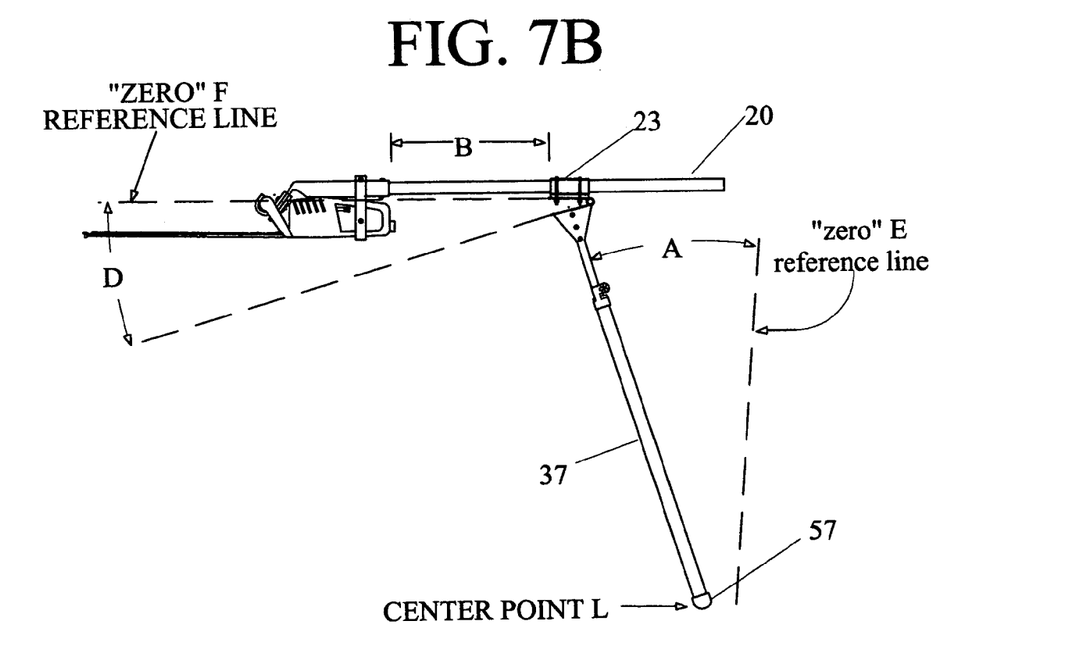
Figure 8:
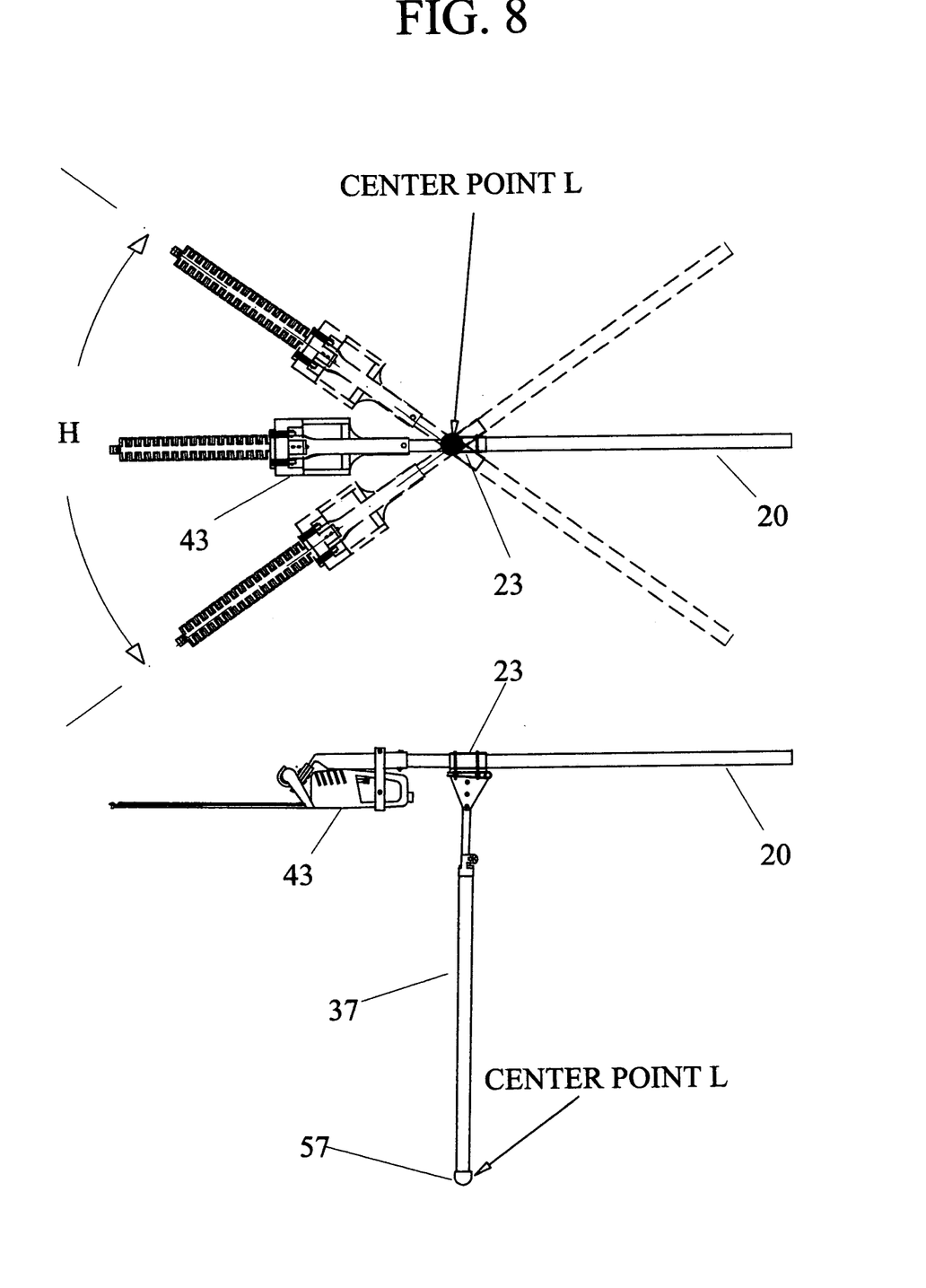
FIG. 8 is a side and top view of the Ground Supported Portable Tool Guide illustrating the range of motion for H and center point L.
Figure 9:
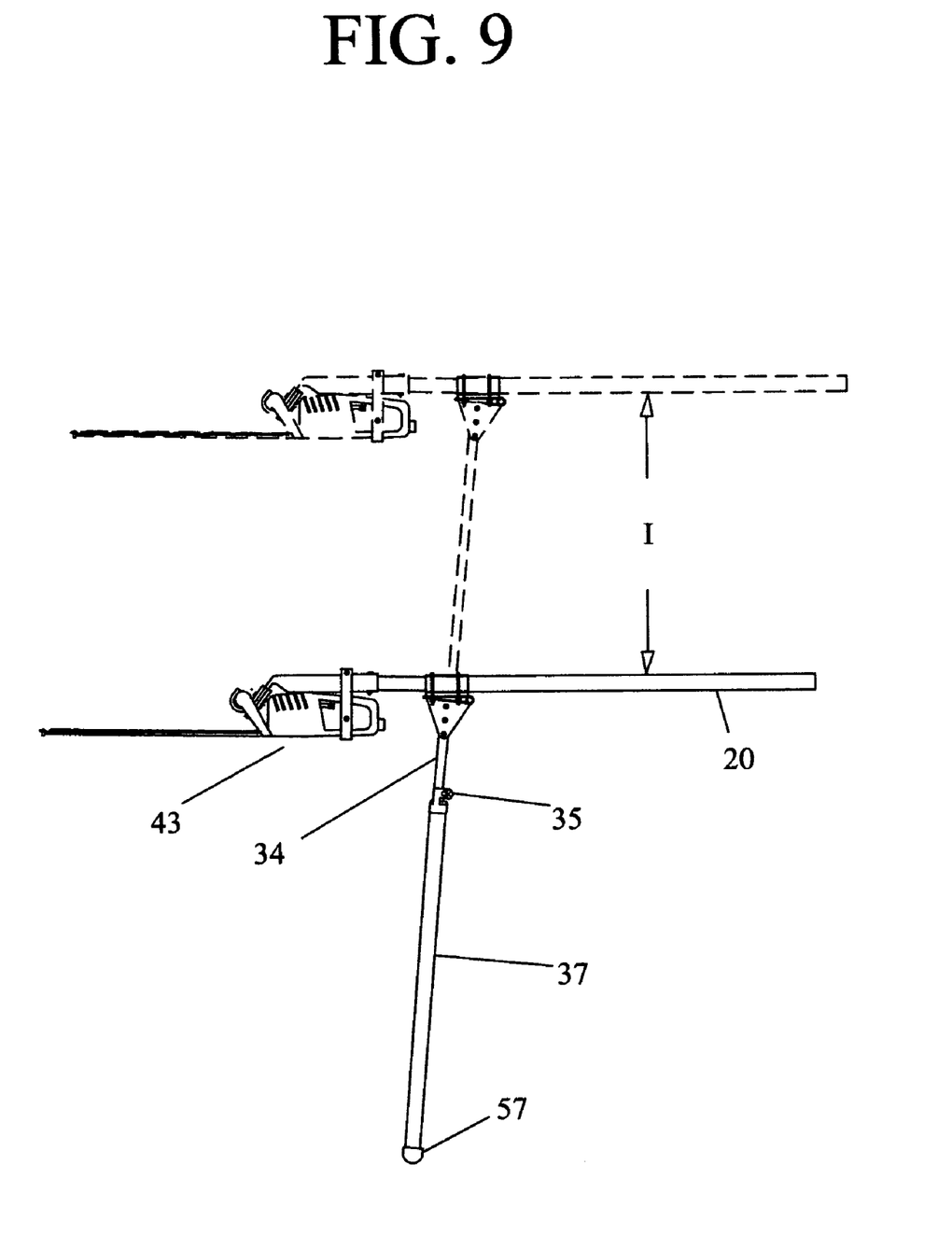
FIG. 9 is a side view of the Ground Supported Portable Tool Guide illustrating the range of height adjustment I.
Figure 10:
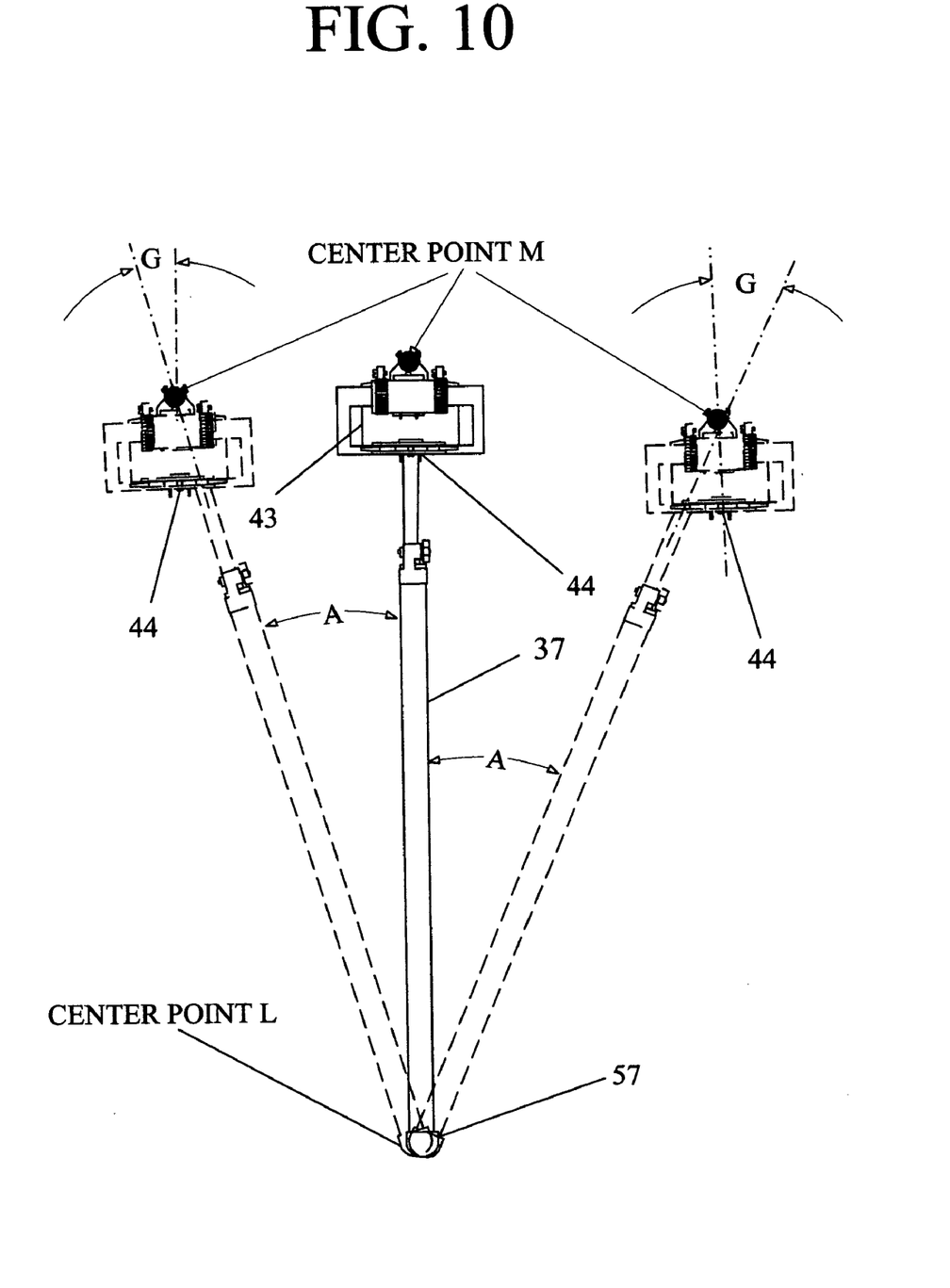
FIG. 10 is a front view of the Ground Supported Portable Tool Guide illustrating the range of motion G, range of motion A, center point L and M

The operator is positioned as shown in FIG. 5A and FIG. 5B. The tool power on/off switch 45 is locked in the "on" position and electrical power is supplied to the portable tool 43. As the operator begins cutting the top of a hedge 52 the Ground Supported Portable Tool Guide allows complete maneuverability in any direction or plane. FIG. 5A, FIG. 7B and FIG. 10 illustrate how the portable tool can be positioned further into the depth of the hedge. The Ground Supported Portable Tool Guide allows the ground support pivoting foot 57 to rest on a surface and establish center point "L". The Ground Supported Portable Tool Guide is then leaned in any direction as shown using "zero" E reference line and radius angle "A". As the Ground Supported Portable Tool Guide is leaned the bottom hinge transition bracket 30, top hinge plate 46, hinge pin 60, portable tool handle extension 20 and tool handle sleeve 23 work in combination to compensate for the change in the angle of the portable tool blade 44 caused as a result of the change of the lean angle "A". The range of rotation angle "D" in FIG. 7B illustrates a range of motion created by the bottom hinge transition bracket 30, top hinge plate 46, hinge pin 60 operating in combination. The radius angle "G" in FIG. 10 illustrates a range of motion created by rotation of the portable tool handle extension 20 within the tool handle sleeve 23 about the center point "M". The center point M is defined as the center of the diameters of portable tool handle extension 20 and tool handle sleeve 23. in FIG. 7A and FIG. 7B Sliding the portable tool handle extension 20 longitudinally within the tool handle sleeve 23 creates a range of motion illustrated as "B" and "C". The range of motion created by "B" and "C" allow the portable tool blade 44 to reach 3 feet to five feet into the depths of tall hedges and still retain complete control of the attitude of the portable tool blade. The range of rotation angle "H" in FIG. 8 illustrates a range of motion created by rotating the Ground Supported Portable Tool Guide in a horizontal plane using center point "L". The range of angular motion "H" allows the portable tool 43 to work a large area of the top section of a hedge 52 without changing the position of the Ground Supported Portable Tool Guide in relation to the hedge. The height adjustment range "I" of the portable tool is illustrated in FIG. 9. The height adjustment locking handle 35 is turned counter clockwise to unlock the position of the height adjustment tube 34 from the height adjustment sleeve 37. The height adjustment tube 34 is telescoping and raised to a desired height and the height adjustment locking handle 35 is turned clockwise until the height height adjustment tube 34 is locked in position in relation to the height adjustment sleeve 37. All of the adjustments previously mentioned except for the height adjustment are performed simultaneously together while work is in progress and while the portable tool is supported primarily by the surface the ground support pivoting foot 57 is positioned on.

Conclusion, Ramifications and Scope

Figure 6:
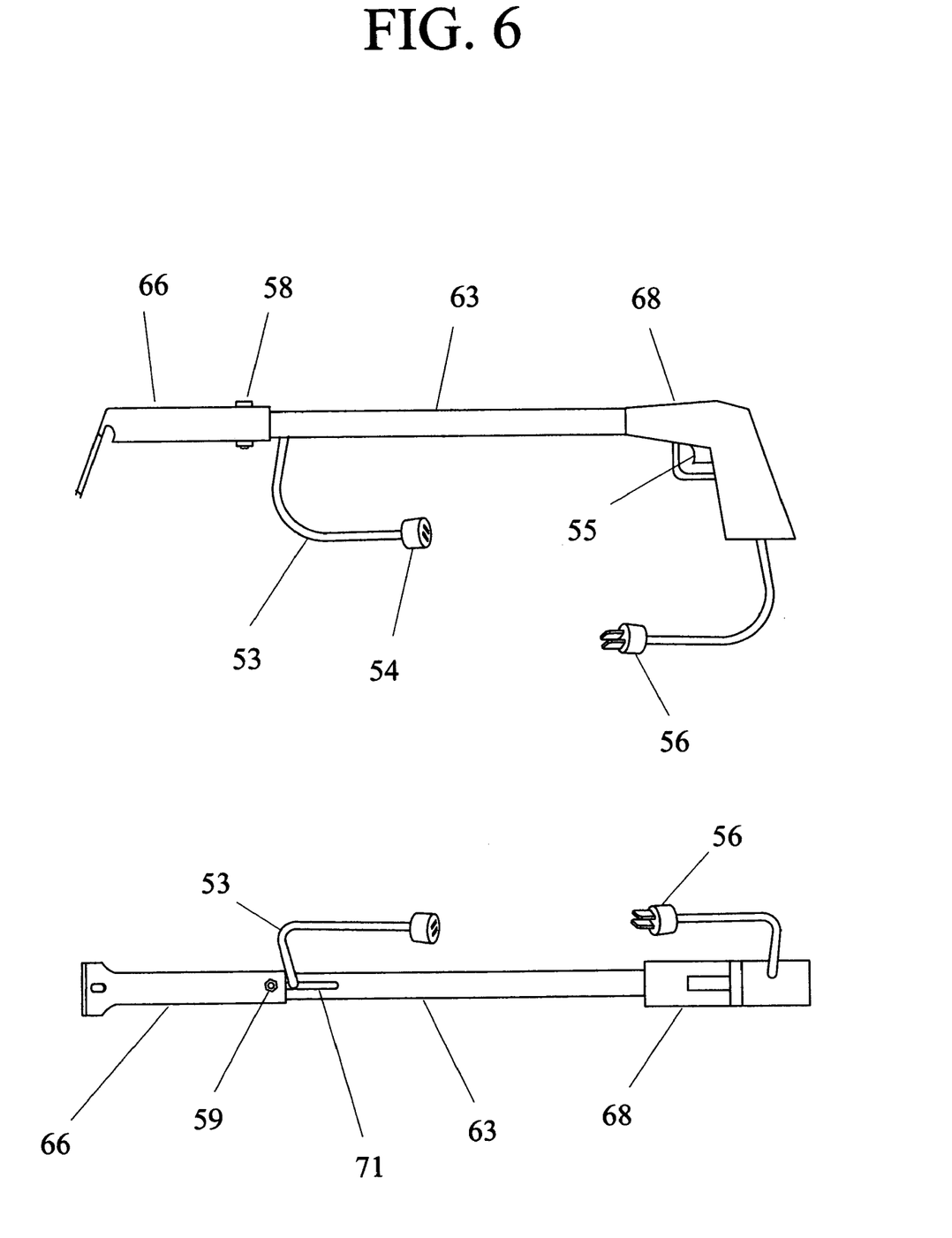
FIG. 6 is a side and bottom view of an alternate embodiment of a electrified handle extension with a power on/off switch, handle grip and electrical cord.

Accordingly, the major difference between the Ground Supported Portable Tool Guide and other devices available is the new capability to support the weight of any portable tool including portable hedge trimmers using a support means other than the operator while enabling the operator to exercise superior control over the attitude of the portable tool's position to perform useful work. This new innovation allows the operator to work much longer periods of time while achieving a higher quality result in the finished work. While my above description contains many specificities these should not be construed as limitations on the scope of the invention, but rather as an exemplification of one preferred embodiment thereof Many other variations are possible. For example FIG. 6 illustrates an electrified handle extension 63 that can be used as an alternate embodiment of the portable tool handle extension 20 when electrical power is preferred to be included as part of the portable tool handle extension 20. The electrified handle extension 63 has a power switch handle grip 68, handle power on/off switch 55 and male electrical receptacle 56 on one end and a cord access slot 71, handle to tool electrical cord 53 and female electrical receptacle 54 on the other end. FIG. 11 shows an alternate design for the hinge coupling assembly. Different types of handles, hinge mechanisms, electrical switches, materials of construction, portable tool attachment configurations, cord retaining means or a slight change in the center of gravity using a height adjustment sleeve that is something other than straight to change the position of the ground support pivoting foot 57 in relation to the portable tool 43 are other possible embodiments and are known by the inventor. Accordingly, the scope of the invention should be determined not by the embodiment but by the appended claims and their legal equivalent.

The invention claimed is:

1. A ground supported portable tool guide comprising:
 a) a tool to handle, adapter said tool to handle adapter is an elongated tube with a first end and a second end said first end is formed to allow a portable tool to be removably attached, said second end having a round cross section
 b) a portable tool handle extension, said portable tool handle extension is an elongated circular tube with a first end and a second end, said first end of said portable tool handle extension has a round cross section formed to be removably attached to said second end of said tool to handle adapter said second end of said portable tool handle extension having a round cross section
 c) a tool to handle adapter and portable tool handle extension coupling means comprising a handle extension retainer fastener, said handle extension retainer fastener is made to removably attach said tool to handle adapter and said portable tool handle extension
 d) a first telescoping assembly includes a tube sleeve, said tube sleeve is a short elongated tube of a circular cross section with a first end and a second end, allowing said portable tool handle extension to be removably inserted telescoping into said tube sleeve, allowing said portable tool handle extension's longitudinal length to shuffle freely within said tube sleeve and allow rotation of said portable tool handle extension within said tube sleeve about an axis parallel to said portable tool handle extension's longitudinal length
 e) a second telescoping assembly comprises a height adjustment tube and a height adjustment sleeve, said height adjustment tube is an elongated tube with a first end and a second end, said height adjustment sleeve is an elongated tube with a first end and a second end said first end of said height adjustment tube is made to insert telescoping into said second end of said height adjustment sleeve and repeatedly and selectively shuttle within said tube sleeve to any position an operator chooses said first end of said height adjustment sleeve having a shape formed to mount to a ground support pivoting foot
 f) a ground support pivoting foot comprises a short round sleeve shaped as a cup with a first end and a second end, said first end is open and has a shape specifically designed to mount to the end of said first end of said height adjustment sleeve and said second end of said ground support pivoting foot is closed off to provide abrasion resistance and contamination prevention to said first end of said height adjustment sleeve
 g) a height adjustment locking means, said height adjustment locking means having a height adjustment locking bracket attached to said second end of said height adjustment sleeve and said height adjustment locking bracket having a height adjustment lock mechanism attached to said height adjustment locking means allowing said height adjustment tube to shuttle to any position within said height adjustment sleeve and be locked into position by said height adjustment lock mechanism
 h) a hinge coupling means connecting said first telescoping assembly's longitudinal length by hinge coupling to said second telescoping assembly's longitudinal length allowing a repeatable adjustable hinged coupled relationship of said first telescoping assembly and said second telescoping assembly to any usable work angle whereby said ground supported portable tool guide offers maximum flexibility and maneuverability when positioning a portable tool to do useful work while reducing the amount of physical effort needed to support the portable tool in position increasing the quality and quantity of work done over time.

2. A tool to handle adapter as recited in claim 1 wherein said tool to handle adapter comprises a tool bracket back plate, tool handle bracket, two tool handle bracket bolts, two tool handle bracket nuts and two tool handle bracket clamps.

3. A tool to handle adapter and portable tool handle extension coupling means as recited in claim 1 wherein said tool to handle adapter and portable tool handle extension coupling means comprises a handle extension retainer bolt and handle retainer nut, said handle retainer bolt and handle retainer nut are made to selectively and repeatedly couple and uncouple said tool to handle adapter and said portable tool handle extension by inserting or extracting said retainer bolt into said handle extension position hole and said adapter position hole when they are in alignment after said first end of said portable tool handle extension is inserted into said second end of said tool to handle adapter.

4. A hinge coupling means as recited in claim 1 wherein said hinge coupling means has a bottom hinge transition bracket, a top binge plate and a hinge pin said bottom, hinge transition bracket is fixedly attached to said second end of said height adjustment tube, said top hinge plate is fixedly attached longitudinally to said tube sleeve of said first telescoping assembly, said bottom hinge transition bracket and said top hinge plate are coupled together using said binge pin placing said first telescoping assembly and said second telescoping assembly in a hinged coupling relationship perpendicular to each other and becoming selectively and repeatedly adjustable to any obtuse angle in relation to each other.

5. A hinge coupling means as recited in claim 1 wherein said hinge coupling means is a combination hinge bracket, said combination hinge bracket has an elongated U-shaped channel and a hinge pin, said U-shaped channel is designed to fit over said height adjustment tube and said hinge pin is inserted through the two parallel sides of said U-shaped channel and through said height adjustment tube creating a hinge coupling between said U-shaped channel and said height adjustment tube the third side of said combination hinge bracket having said tube sleeve longitudinally fixedly attached.

6. A portable tool handle extension as recited in claim 1 further including a cord access slot, a handle to tool electrical cord, a power switch handle grip, a on/off power switch, a male electrical receptacle and a female electrical receptacle, said handle to tool electrical cord inserts into said first end of said portable tool handle extension and extends through and electrically terminates to said power on/off switch, said power on/off switch is fixedly attached and held in position on said power switch handle grip, said power switch handle grip is fixedly attached to said second end of said portable tool handle extension, said male electrical receptacle is electrically terminated to the on/off switch and configured so that when said power on/off switch is actuated electric current can flow from said male electrical receptacle and said female electrical receptacle, said cord access slot is positioned at said first end of said portable tool bundle extension and allows said handle to tool electrical cord and said female receptacle to be inserted through said tube sleeve after said first end of said portable tool handle extension is inserted into said second end of said tool to handle adapter.

7. A ground support pivoting foot as recited in claim 1 wherein said pound support pivoting foot is a cup shaped cylindrical cap.

* * * * *